Figure 1:
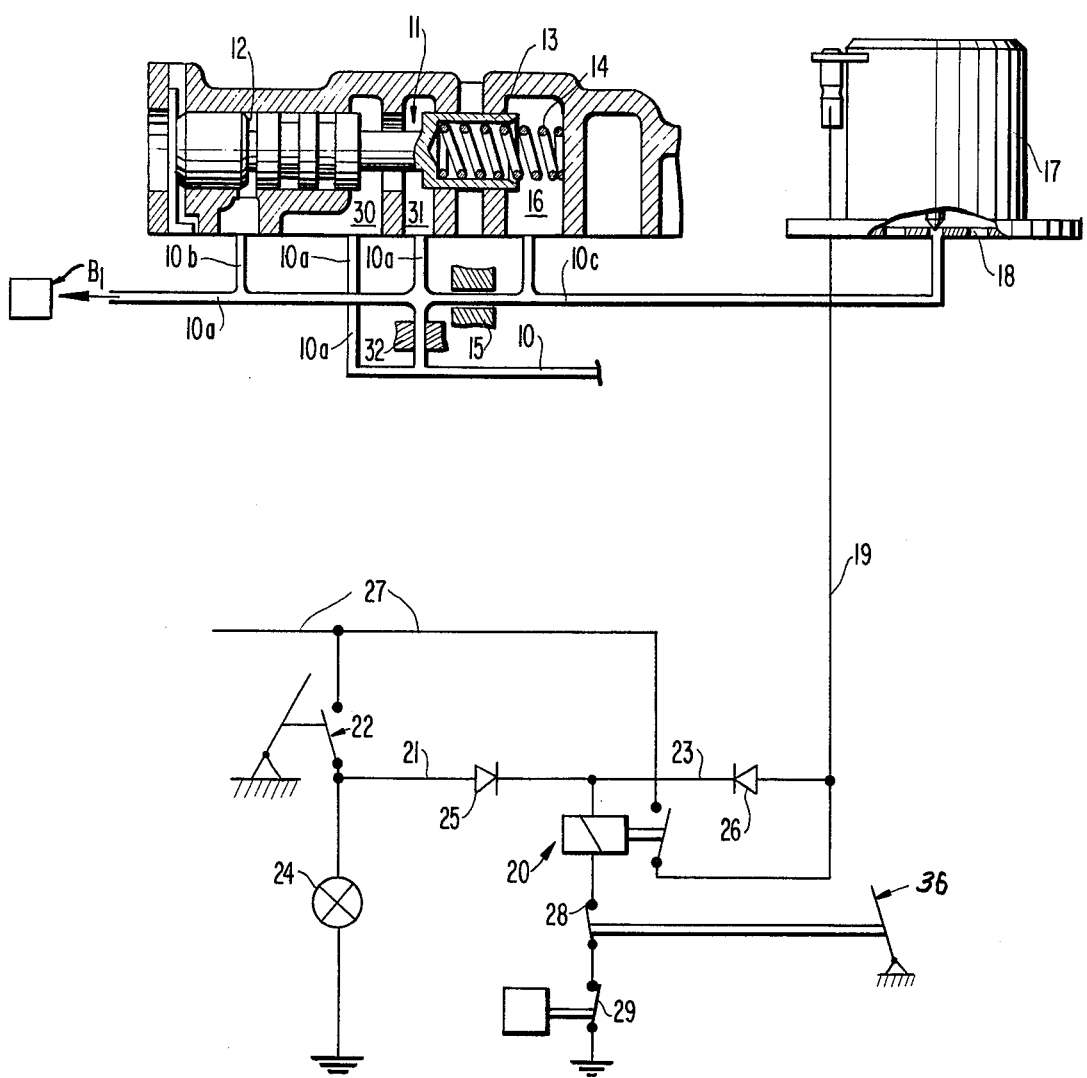

United States Patent [19]

Förster et al.

[11] 4,105,101

[45] Aug. 8, 1978

[54] BRAKE OPERATED LOW RATIO RELEASE

[75] Inventors: Hans-Joachim Förster, Stuttgart; Ulrich Eltze, Esslingen, both of Fed. Rep. of Germany

[73] Assignee: Daimler-Benz Aktiengesellschaft, Fed. Rep. of Germany

[21] Appl. No.: 687,889

[22] Filed: May 19, 1976

[30] Foreign Application Priority Data

May 21, 1975 [DE] Fed. Rep. of Germany ....... 2522420

[51] Int. Cl.² .......................................... B60K 29/00
[52] U.S. Cl. .................................. 192/4 A; 192/0.055; 74/846
[58] Field of Search ................. 192/4 A, 3 TR, 3 R; 74/846

[56] References Cited

U.S. PATENT DOCUMENTS

| 2,403,720 | 7/1946 | Hunt | 123/119 F |
|---|---|---|---|
| 2,990,925 | 7/1961 | Bernotas | 192/4 A |
| 3,033,333 | 5/1962 | Breting et al. | 192/4 A |
| 3,715,017 | 2/1973 | Jenney | 192/4 A |
| 3,850,273 | 11/1974 | Murakami | 192/4 A |

Primary Examiner—Benjamin W. Wyche
Attorney, Agent, or Firm—Craig & Antonelli

[57] ABSTRACT

A drive arrangement for motor vehicles equipped with a mechanism for raising the idling rotational speed of the driving engine during its warm-up phase and with an automatic transmission whose lowest speed is adapted to be engaged by at least one servo-device; the servo-device is thereby adapted to be automatically disengaged upon actuation of the vehicle brake in the lowest speed which is coordinated to the selected drive range.

24 Claims, 2 Drawing Figures

BRAKE OPERATED LOW RATIO RELEASE

The present invention relates to a drive arrangement for motor vehicles, for example, for commercial and passenger motor vehicles, and especially with a mechanism for raising the idling rotational speed of the driving engine during its warm-up phase as well as with an automatically shifting change-speed transmission whose lowest speeds are adapted to be engaged respectively by at least one servo-device.

The cooperation between an automatic transmission and the corresponding driving engine can lead to driving difficulties, for example, at lower velocities and also in the warm-up phase thereof, especially if the rotational speed of the engine is very high as a result of an automatic starting mechanism in Otto engines or as a result of an upwardly adjusted idling in Diesel engines. If the automatic transmission is then engaged, there exists a very strong creeping tendency. In order to stop such a vehicle in this condition, for example, at a crossing, the driver has to brake relatively strongly. This in turn leads again to an over-braking of the front wheels, which may render the vehicle incapable of maneuvering in case of slippery roads, for example, on ice.

The present invention is concerned with the task to propose an installation, by means of which an overbraking of the wheels in the creeping condition is automatically avoided upon actuation of the brake. The underlying problems are solved according to the present invention with the drive arrangements of the type described above in that in the lowest speed——which is coordinated to the selected driving range——a servo-device is adapted to be disengaged in dependence on the actuation of the vehicle brake. This means, in other words, during the brake actuation, the transmission is temporarily shifted from the lowest speed to neutral so that the feared creeping is eliminated and an overbraking of the wheels cannot occur.

According to a further feature of the inventive concept, the respective servo-device of the lowest speed is disengageable only up to a slight abutment or engaging force. In this manner, the advantage is achieved that practically no time has to be used up for filling the pressure spaces of the servo-device when starting up again, but instead the pressure has to be increased only from the slight abutment or engaging pressure to the full pressure. A very rapid re-engagement of the lowest speed will result in this manner. According to a further feature of the inventive concept, the disengagement of the servo-device is automatically cancelled out again only upon the actuation of the drive pedal. It is avoided in this manner that an engaging shock occurs already during the release of the vehicle brake.

Most of the automatic transmissions are equipped with pressure-medium-actuated servo-devices, i.e., with clutches and brakes. Depending on the transmission construction, the lowest speed is then shifted by a pressure-medium-actuated clutch or by a pressure-medium-actuated brake. It is proposed in detail therefor by the present invention that the working pressure line leading to this servo-device is conducted by way of a slide valve which in its first, ineffective position opens up unobstructedly the through-flow and which in its second, effective position reduces the pressure to a minimum engaging pressure, for example, 0.5 atm. According to the present invention, the slide valve may be acted upon on its first end surface by the pressure in the working pressure line and on its second end face by a spring matched to the minimal abutment or engaging pressure and a space accommodating the second end surface is then additionally connected with a section of the working pressure line connected by way of a throttle, which is adapted to be relieved to zero by way of a solenoid valve.

For the electric control, it is proposed according to the present invention that a shifting relay with a holding circuit is arranged in the energizing circuit of the normally closed solenoid valve, whereby a switch closing upon actuation of the brake is connected in the energizing circuit of the shifting relay. Furthermore, provision is made according to the present invention that a switch which opens when giving gas, and a switch which opens with an increasing control pressure, are arranged in series in the energizing circuit of the shifting relay. This offers the advantage that the shifting can become effective only below a predetermined vehicle velocity of, for example, 10 km/h. Many vehicles are equipped with an engine brake. If the re-engagement should become noticeable in a disturbing manner when driving on a dry road and when giving gas rapidly, then it is possible according to the present invention that the current supply to the electric control circuits, i.e., to the holding and energizing circuits are so connected by way of the main switch of the engine brake that selectively only the engine brake or the electric control is adapted to be engaged. This is thereby predicated on the consideration that with a smooth or slippery road, the engine brake has to be disengaged in principle, and the control for the arrangement provided according to the present invention is then automatically interconnected.

Accordingly, it is an object of the present invention to provide a drive arrangement for a motor vehicle which avoids by simple means the aforementioned shortcomings and drawbacks encountered in the prior art.

Another object of the present invention resides in a drive arrangement for motor vehicles in which difficulties are eliminated at low velocities during the warm-up phase of the engine while the idling speed is artificially raised.

A further object of the present invention resides in a drive arrangement for motor vehicles which eliminates the strong creeping tendency of the vehicle equipped with an automatic transmission during the warm-up phase of the engine.

Still a further object of the present invention resides in a drive arrangement for motor vehicles of the type described above in which an over-braking of the front wheels in the creeping condition is avoided.

Still another object of the present invention resides in a drive arrangement for motor vehicles in which the lowest speed is automatically disengaged upon actuation of the brake at idling and at low velocities.

A further object of the present invention resides in a drive arrangement for motor vehicles in which the lowest speed is automatically disengaged under certain driving conditions upon actuation of the brake, yet the re-engagement of the lowest speed is made possible in a very short period of time.

Figure 2:
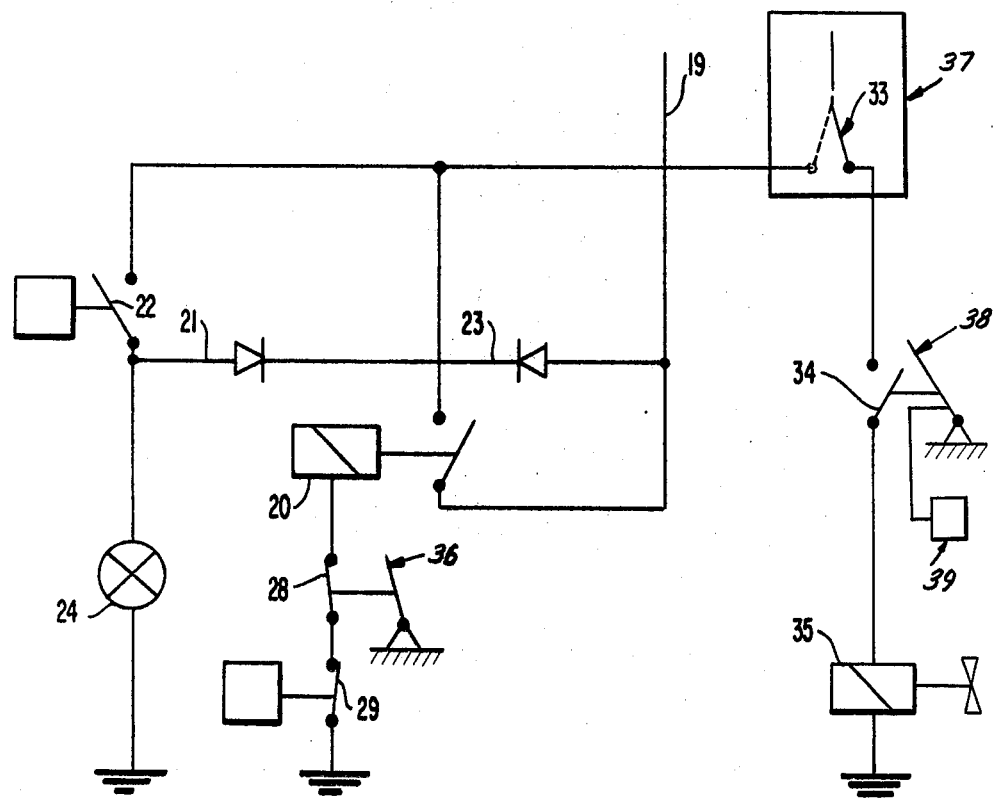

These and further objects, features and advantages of the present invention will become more apparent from the following description when taken in connection with the accompanying drawing which shows, for purposes of illustration only, two embodiments in accordance with the present invention, and wherein:

FIG. 1 is a schematic diagram of an electrical control system in accordance with the present invention illustrating the additional shifting slide valve partly in cross section; and FIG. 2 is a schematic diagram of a modified electrical control system in accordance with the present invention for motor vehicles equipped with an engine brake.

Referring now to the drawing wherein like reference numerals are used throughout the two views to designate like parts, and more particularly to FIG. 1, according to this figure the working pressure line 10 which comes from the automatic transmission shifting mechanism is conducted with its sections 10a by way of the central portion of a blocking slide valve generally designated by reference numeral 11 to the servo-device formed by brake or clutch $B_1$ of the first speed (not illustrated beyond a schematic representation, such devices being known per se). A short line section 10b branches off from the line section 10a, by way of which the slide valve 11 is acted upon on its left-end surface 12 with the pressure prevailing at the brake $B_1$. A spring 14 acts on the right end surface 13 of the slide valve 11 which is matched to a minimum abutment or engaging pressure of, for example, 0.5 atm. A line section 10c branches off from the line section 10a by way of a throttle 15. The line section 10c, on the one hand, is in communication with the space 16 accommodating the spring 14 and, on the other, is normally closed by a solenoid valve 17. Upon energization of the solenoid valve 17, this line section 10c is relieved to zero by way of the openings 18 at the solenoid valve 17.

The energizing circuit 19 of the solenoid valve 17 includes the switching contacts of a shifting relay generally designated by reference numeral 20 which closes its contacts when energized. A switch 22 which closes upon brake actuation is connected in the energizing circuit 21 of the relay 20. A holding circuit 23 is connected in parallel therewith, whereas the brake light 24 is connected in parallel to the relay 20 itself. The energizing circuit 21 and the holding circuit 23 are separated from one another by oppositely connected diodes 25 and 26.

The current supply to the energizing circuit 21 and to the holding circuit 23 takes place by way of the connecting line 27. It should additionally be mentioned that a normally closed switch 28 and a control pressure switch 29 are series connected with both circuits. The first-mentioned switch 28 is opened upon actuation of the gas pedal 36. The control pressure switch 29 is open in the normal operating condition and closes when the control pressure drops below a predetermined value, i.e., it closes at a low driving velocity of, for example, 10 km/h.

It is assumed that the vehicle is in the condition when it rolls out, i.e., decelerates by itself, with an engaged first speed. The working pressure line 10 and the brake $B_1$ are then under full pressure so that the blocking slide valve 11 is in the illustrated left-end position. This is so as the full pressure has built up in the line section 10c as a result of the closed solenoid valve 17 so that the spring 14 keeps the blocking slide valve 11 in the mentioned left-end position. In this left-end position, the passage for the working pressure is unobstructedly free by way of the spaces 30 and 31 at the slide valve 11.

If the brake pedal is now actuated, then the switch 22 closes the energizing circuit 21 and the relay 20 is energized and thus closes, in its turn, the energizing circuit 19 of the solenoid valve 17. The relay 20 then holds itself in the energized condition by way of the holding circuit 23. The solenoid valve 17 which has been energized as a result of the closing of its energizing circuit 19 now vents the line section 10c to zero so that the pressure in the space 16 collapses. As a result thereof, the blocking slide valve 11 now passes over into its control position, i.e., it regulates in the line section 10a a minimum abutment or engaging pressure which is determined by the spring 14. An additional throttle 32 only permits so much pressure medium to flow in, as now flows off by way of the control edges of the blocking slide valve 11 now acting as excess pressure valve. The brake $B_1$ is now disengaged and is held by the minimum engaging pressure only in the working position without transmitting thereby any significant torque.

The described condition also continues upon the release of the brake pedal since the relay 20 now is held energized by way of its holding circuit 23. If, however, the gas pedal is now actuated, then the switch 28 opens the holding circuit 23 and the relay 20 becomes de-energized and drops off. The solenoid valve 17 also closes therewith so that the full pressure is again able to build up in the space 16 at the slide valve 11. The brake $B_1$ is therefore again engaged with full pressure.

According to FIG. 2, the basic construction for the control of the solenoid valve 17, no longer illustrated in this figure, by way of the line 19 is the same. However, the switch 22 in the energizing circuit 21 is now actuated by a pneumatically actuated brake valve. The current supply to the control circuits takes place, however, by way of the main switch 33 of the schematically represented engine brake 37 (which is constituted by conventional devices also known as exhaust brakes) and more particularly in such a manner that either the engine brake (exhaust brake) or the control circuits are engaged. In the illustrated position, for example, the engine brake (exhaust brake) is engaged so that upon actuation of the brake pedal 38 of the brake 39 the valve 35 for the engine brake (exhasut brake) can be actuated by way of the switch 34. The control circuits for the solenoid valve 17 are disconnected in this case. This switching position is customarily used with a dry road.

If the road is now slippery or icy, then customarily the engine brake is disengaged by switching over its main switch 33 into the position illustrated in dash lines. The control circuits are thereby connected now simultaneously to the current supply so that the already described control operation can now take place in the manner previously described due to energizing and holding circuits 21, 23, respectively, being connected to the power supply through connecting line 27 and switch 33.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A drive arrangement for motor vehicles with a vehicle brake, and means for raising the idling rotational speed of the driving engine during its warm-up phase comprising automatic transmission means having a drive range including a plurality of speed ratios including at least one servo means for engaging the lowest speed ratio thereof, characterized by control means operable to disengage only the servo-means for the lowest speed ratio of the drive range, in dependence on the actuation of the vehicle brake, and when the transmission means is in the remaining ratios, said ratios remain engaged when said brake is applied.

2. A drive arrangement according to claim 1, characterized in that the control means is operable to disengage the servo-means of the lowest speed up to a slight engaging force.

3. A drive arrangement for motor vehicles according to claim 1, characterized in that the control means is operable to automatically cancel out the disengagement of the servo-means only upon actuation of a gas pedal.

4. A drive arrangement according to claim 1, with a pressure-medium-actuated servo-means for the lowest speed, characterized in that the transmission means includes a working pressure line leading to said servo-means by way of a slide valve means, said slide valve means being operable in its first, ineffectual position to open up substantially unobstructedly the through-flow and in its second effective position to reduce the pressure to a minimum engaging pressure.

5. A drive arrangement according to claim 4, characterized in that the servo-means forms part of a brake for engaging the lowest speed of the transmission.

6. A drive arrangement according to claim 4, characterized in that the minimum pressure is about 0.5 atm.

7. A drive arrangement according to claim 4, characterized in that the slide valve means on its first end face is actuated by the pressure in the working pressure line and on its second end face by a spring essentially matched to the minimum engaging pressure, and in that a space of the slide valve means accomodating the second end surface is additionally connected with a section of the working pressure line connected with the working pressure line by way of a throttle means, said section being operable to be relieved to zero by way of a solenoid valve means.

8. A drive arrangement according to claim 7, characterized in that the solenoid valve means is normally closed and includes a solenoid valve energizing circuit, a shifting relay means having a holding circuit and operatively connected in said solenoid valve energizing circuit, said relay means including a relay energizing circuit, and a switch means closing upon actuation of the vehicle brake connected in said relay energizing circuit.

9. A drive arrangement according to claim 8, characterized in that a switch opening when giving gas and a switch opening with increasing control pressure are connected in series with the relay energizing circuit and the holding circuit.

10. A drive arrangement according to claim 9, wherein said arrangement is provided with an engine brake means, and characterized in that the current supply to the control circuits of the control means is connected by way of a main switch in such a manner that selectively only the engine brake or the control circuits are adapted to be engaged.

11. A drive arrangement according to claim 10, characterized in that the control means is operable to disengage the servo-means of the lowest speed only up to a slight engaging force.

12. A drive arrangement for motor vehicles according to claim 11, characterized in that the control means is operable to automatically cancel out the disengagement of the servo-means only upon actuation of a gas pedal.

13. A drive arrangement according to claim 12, characterized in that the minimum pressure is about 0.5 atm.

14. A drive arrangement with a pressure-medium-actuated servo-means for the lowest speed of the transmission means and a slide valve means for regulating the pressure to a working pressure line leading to said servo-means according to claim 1, characterized in that the slide valve means on its first end face is actuated by the pressure in the working pressure line and on its second end face by a spring essentially matched to the minimum engaging pressure, and in that a space of the slide valve means accommodating the second end surface is additionally connected with a section of the working pressure line connected with the working pressure line by way of a throttle means, said section being operable to be relieved to zero by way of a solenoid valve means.

15. A drive arrangement according to claim 1, characterized in that the control includes a solenoid valve means, and in that the solenoid valve means is normally closed and includes a solenoid valve energizing circuit, a shifting relay means having a holding circuit and operatively connected in said solenoid valve energizing circuit, said relay means including a relay energizing circuit, and a switch means closing upon actuation of the vehicle brake connected in said relay energizing circuit.

16. A drive arrangement according to claim 15, characterized in that a switch opening when giving gas and a switch opening with increasing control pressure are connected in series with the relay energizing circuit and the holding circuit.

17. A drive arrangement according to claim 15, wherein said arrangement is provided with an engine brake means, and characterized in that the current supply to the control circuits of the control means is connected by way of a main switch in such a manner that selectively only the engine brake or the control circuits are adapted to be engaged.

18. A drive arrangement according to claim 1, with an engine brake means, characterized in that the current supply to the control circuits of the control means is connected by way of a main switch in such a manner that selectively only the engine brake or the control circuits are adapted to be engaged.

19. A drive arrangement for motor vehicles with a vehicle brake and means for raising the idling rotational speed of the driving engine during its warm-up phase comprising automatic transmission means including at least one servo means for engaging the lowest speeds thereof, characterized by control means operable to disengage the servo-means in the lowest speed coordinated to the selected drive range, in dependence on the actuation of the vehicle brake, and further characterized in that the transmission means includes a working pressure line leading to said servo-means by way of a slide valve means, said slide valve means being operable in its first, ineffectual position to open up substantially unobstructedly the throughflow and in its second effective position to reduce the pressure to a minimum engaging pressure, wherein the slide valve means on its first end face is actuated by the pressure in the working pressure line and on its second end face by a spring essentially matched to the minimum engaging pressure, and in that a space of the slide valve means accommodating the second end surface is additionally connected with a section of the working pressure line connected with the working pressure line by way of a throttle means, said section being operable to be relieved to zero by way of a solenoid valve means.

20. A drive arrangement according to claim 19, characterized in that the solenoid valve means is normally closed and includes a solenoid valve energizing circuit, a shifting relay means having a holding circuit and operatively connected in said solenoid valve energizing circuit, said relay means including a relay energizing circuit, and a switch means closing upon actuation of the vehicle brake connected in said relay energizing circuit.

21. A drive arrangement according to claim 20, characterized in that a switch opening when giving gas and a switch opening with increasing control pressure are connected in series with the relay energizing circuit and the holding circuit.

22. A drive arrangement for motor vehicles with a vehicle brake and means for raising the idling rotational speed of the driving engine during its warm-up phase comprising automatic transmission means including at least one servo means for engaging the lowest speeds thereof, characterized by control means operable to disengage the servo-means in the lowest speed coordinated to the selected drive range, in dependence on the actuation of the vehicle. brake, further characterized in that a slide valve means for regulating the pressure to a working pressure line leading to said servo-means is provided and the slide valve means on its first end face is actuated by the pressure in the working pressure line and on its second end face by a spring essentially matched to the minimum engaging pressure, and in that a space of the slide valve means accommodating the second end surface is additionally connected with a section of the working pressure line connected with the working pressure line by way of a throttle means, said section being operable to be relieved to zero by way of a solenoid valve means.

23. A drive arrangement for motor vehicles with a vehicle brake and means for raising the idling rotational speed of the driving engine during its warm-up phase comprising automatic transmission means including at least one servo means for engaging the lowest speeds thereof, characterized by control means operable to disengage the servo-means in the lowest speed coordinated to the selected drive range, in dependence on the actuation of the vehicle brake, and further characterized in that the control means includes a solenoid valve means, and in that the solenoid valve means is normally closed and includes a solenoid valve energizing circuit, a shifting relay means having a holding circuit and operatively connected in said solenoid valve energizing circuit, said relay means including a relay energizing circuit, and a switch means closing upon actuation of the vehicle brake connected in said relay energizing circuit.

24. A drive arrangement according to claim 23, characterized in that a switch opening when giving gas and a switch opening with increasing control pressure are connected in series with the relay energizing circuit and the holding circuit.

* * * * *